United States Patent
Kouda et al.

(10) Patent No.: US 11,433,713 B2
(45) Date of Patent: Sep. 6, 2022

(54) PNEUMATIC TIRE

(71) Applicant: The Yokohama Rubber Co., LTD., Tokyo (JP)

(72) Inventors: Hiraku Kouda, Hiratsuka (JP);
Takayuki Shiraishi, Hiratsuka (JP);
Tatsuro Shinzawa, Hiratsuka (JP);
Takanori Uemura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 344 days.

(21) Appl. No.: 16/486,488

(22) PCT Filed: Dec. 27, 2017

(86) PCT No.: PCT/JP2017/046990
§ 371 (c)(1),
(2) Date: Aug. 15, 2019

(87) PCT Pub. No.: WO2018/150746
PCT Pub. Date: Aug. 23, 2018

(65) Prior Publication Data
US 2020/0047560 A1   Feb. 13, 2020

(30) Foreign Application Priority Data
Feb. 17, 2017 (JP) .............................. JP2017-027544

(51) Int. Cl.
*B60C 11/12* (2006.01)

(52) U.S. Cl.
CPC ...... *B60C 11/1281* (2013.01); *B60C 11/1204* (2013.01); *B60C 11/1236* (2013.01); *B60C 2011/1213* (2013.01)

(58) Field of Classification Search
CPC ..................... B60C 11/1236; B60C 11/1281
See application file for complete search history.

(56) References Cited

U.S. PATENT DOCUMENTS

2010/0084062 A1\* 4/2010 Miyazaki ............ B60C 11/1281
152/209.18
2013/0206298 A1 8/2013 Guillermou et al.
(Continued)

FOREIGN PATENT DOCUMENTS

CN 204712798 10/2015
EP 355636 A2 \* 2/1990
(Continued)

OTHER PUBLICATIONS

Machine translation for Japan 2015-231812 (Year: 2022).\*
(Continued)

*Primary Examiner* — Steven D Maki
(74) *Attorney, Agent, or Firm* — Thorpe North & Western

(57) ABSTRACT

In a pneumatic tire, a sipe includes an edge on a leading side and an edge on a trailing side; the edge and the edge each include a chamfered portion shorter than a sipe length of the sipe; a non-chamfered region in which other chamfered portions are not present is provided at portions facing the chamfered portions of the sipe; and for all chamfered portions, including at least the chamfered portions of the sipe, formed on grooves other than main grooves, with a ground contact width being equally divided into three in the tire lateral direction, a total volume $S_{CE}$ of chamfered portions provided in a center region centrally located in the tire lateral direction and each of total volumes $S_{SH}$ of chamfered portions provided in shoulder regions located on either side of the center region satisfy a relationship $S_{CE} < S_{SH}$.

11 Claims, 11 Drawing Sheets

(56) References Cited

U.S. PATENT DOCUMENTS

| | | |
|---|---|---|
| 2013/0248068 A1 | 9/2013 | Nakata |
| 2015/0210121 A1 | 7/2015 | Sanae |
| 2016/0152090 A1 | 6/2016 | Takemoto |
| 2016/0297254 A1 | 10/2016 | Numata |
| 2017/0190221 A1 | 7/2017 | Kato |
| 2018/0170114 A1 | 6/2018 | Hayashi |

FOREIGN PATENT DOCUMENTS

| | | | |
|---|---|---|---|
| EP | 3 015 286 | | 5/2016 |
| EP | 3 025 874 | | 6/2016 |
| JP | 2005-075213 A | * | 3/2005 |
| JP | 2013-035345 | | 2/2013 |
| JP | 2013-537134 | | 9/2013 |
| JP | 2015-047977 | | 3/2015 |
| JP | 2015-140047 | | 8/2015 |
| JP | 2015-160487 | | 9/2015 |
| JP | 2015-231812 A | * | 12/2015 |
| JP | 2017-001584 | | 1/2017 |
| WO | WO 2012/032144 | | 3/2012 |
| WO | WO 2012/098895 | | 7/2012 |
| WO | WO 2015/083474 | | 6/2015 |
| WO | WO 2015/182024 | | 12/2015 |
| WO | WO 2016/199519 | | 12/2016 |

OTHER PUBLICATIONS

Machine translation for Japan 2005-075213 (Year: 2022).*
International Search Report for International Application No. PCT/JP2017/046990 dated Mar. 27, 2018, 4 pages, Japan.

* cited by examiner

PNEUMATIC TIRE

TECHNICAL FIELD

The present technology relates to a pneumatic tire and particularly relates to a pneumatic tire that can provide improved steering stability performance on dry road surfaces and improved steering stability performance on wet road surfaces in a compatible manner by devising a sipe chamfer shape.

BACKGROUND ART

In the related art, in a tread pattern of a pneumatic tire, a plurality of sipes are formed in a rib defined by a plurality of main grooves. By providing such sipes, drainage properties are ensured, and steering stability performance on wet road surfaces is exhibited. However, when a large number of sipes are disposed in a tread portion in order to improve the steering stability performance on wet road surfaces, the rigidity of the ribs decreases, which has the disadvantage that steering stability performance on dry road surfaces deteriorates.

Various pneumatic tires have been proposed in which sipes are formed in a tread pattern and chamfered (for example, see Japan Unexamined Patent Publication No. 2013-537134). When the sipes are formed and chamfered, edge effects may be lost depending on the shape of the chamfers, and depending on the dimensions of the chamfers, improvement of steering stability performance on dry road surfaces and improvement of steering stability performance on wet road surfaces may be insufficient.

SUMMARY

The present technology provides a pneumatic tire that can provide improved steering stability performance on dry road surfaces and improved steering stability performance on wet road surfaces in a compatible manner by devising a sipe chamfer shape.

A pneumatic tire according to an embodiment of the present technology is a pneumatic tire, comprising:

in a tread portion, main grooves extending in a tire circumferential direction; and a sipe extending in a tire lateral direction disposed in ribs defined by the main grooves; wherein the sipe comprises an edge on a leading side and an edge on a trailing side;

the edge on the leading side and the edge on the trailing side each comprise a chamfered portion shorter than a sipe length of the sipe;

a non-chamfered region in which other chamfered portions are not present is provided at portions facing the chamfered portions of the sipe; and for all chamfered portions, comprising at least the chamfered portions of the sipe, formed on grooves other than the main grooves, with a ground contact width being equally divided into three in the tire lateral direction, a total volume $S_{CE}$ of chamfered portions provided in a center region centrally located in the tread portion in the tire lateral direction and each of total volumes $S_{SH}$ of chamfered portions provided in shoulder regions located on either side of the center region satisfy a relationship $S_{CE} < S_{SH}$.

In an embodiment of the present technology, the pneumatic tire includes sipes that extend in the tire lateral direction in ribs defined by the main grooves. The chamfered portion that is shorter than the sipe length of the sipe is provided on each of the edge on the leading side and the edge on the trailing side of the sipe, and the non-chamfered regions in which other chamfered portions are not present are disposed at the portions facing the chamfered portions of the sipe. Thus, the drainage effect can be improved with the chamfered portions, and a water film can be effectively removed by the edge effect in the non-chamfered regions. As a result, the steering stability performance on wet road surfaces can be greatly improved. Moreover, the chamfered portion and the non-chamfered region are disposed alongside each other on the edge on the leading side and the edge on the trailing side in this manner. Thus, the effect of enhancing wet performance as described above when braking and driving can be maximally achieved. Additionally, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner. Furthermore, for all the chamfered portions, including at least the chamfered portions of the sipes, formed on grooves other than the main grooves, with the ground contact width being equally divided into three in the tire lateral direction, the total volume $S_{CE}$ of the chamfered portions provided in the center region centrally located in the tire lateral direction can be made relatively small to improve the steering stability performance on dry road surfaces, and each of the total volumes $S_{SH}$ of the chamfered portions provided in the shoulder regions located on either side of the center region can be made relatively large to improve the steering stability performance on wet road surfaces. As a result, the steering stability performance on dry road surfaces and the steering stability performance on wet road surfaces can be enhanced in a well-balanced manner.

In an embodiment of the present technology, preferably a maximum depth x (mm) of the sipe and a maximum depth y (mm) of the chamfered portions satisfy a relationship of Formula (1); and a sipe width of the sipe is constant in a range from an end portion located on an inner side in a tire radial direction of the chamfered portion to a groove bottom of the sipe. In this way, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner.

$$x \times 0.1 \leq y \leq x \times 0.3 + 1.0 \quad (1)$$

In an embodiment of the present technology, preferably, for the all chamfered portions, the total volume $S_{CE}$ of the chamfered portions provided in the center region and each of the total volumes $S_{SH}$ of the chamfered portions provided in the shoulder regions satisfy Formula (2). In this way, the steering stability performance on dry road surfaces and the steering stability performance on wet road surfaces can be enhanced in a well-balanced manner. More preferably, the range is from 30% to 100%.

$$10\% \leq (S_{SH} - S_{CE})/S_{CE} \times 100\% \leq 200\% \quad (2)$$

In an embodiment of the present technology, preferably the sipe is disposed in two or more ribs of the ribs defined by the main grooves. In this way, the steering stability performance on dry road surfaces and the steering stability performance on wet road surfaces can be enhanced in a well-balanced manner.

In an embodiment of the present technology, preferably, the all chamfered portions are configured by the chamfered portion of the sipe. In this way, the steering stability performance on dry road surfaces and the steering stability performance on wet road surfaces can be enhanced in a well-balanced manner.

In an embodiment of the present technology, preferably, for the all chamfered portions, a total projected area $A_{CE}$ of the chamfered portions provided in the center region and each of total projected areas $A_{SH}$ of the chamfered portions provided in the shoulder regions satisfy a relationship $A_{CE} \geq A_{SH}$. The shoulder regions are large contributors to noise performance. Thus, by the total projected area $A_{SH}$ of the chamfered portions in the shoulder regions being relatively small, the ground contact pressure of the shoulder regions being small, and the total volume $S_{SH}$ of the chamfered portions in the shoulder region being large, improvements in noise performance and improvements in steering stability performance on wet road surfaces can be achieved in a compatible manner.

In an embodiment of the present technology, preferably, for the all chamfered portions, the total projected area $A_{CE}$ of the chamfered portions provided in the center region and each of the total projected areas $A_{SH}$ of the chamfered portions provided in the shoulder regions satisfy Formula (3). In this way, the steering stability performance on dry road surfaces, the steering stability performance on wet road surfaces, and noise performance can be enhanced in a well-balanced manner. More preferably, the range is from 3% to 8%.

$$1\% \leq (A_{CE} - A_{SH})/A_{CE} \times 100\% \leq 10\% \tag{3}$$

In the present technology, "volume of the chamfered portions" is the volume of the region surrounded by the groove including the chamfered portion, the profile line of the chamfered portion, and the road contact surface of the tread portion. In other words, it is the cut-off amount of the edge portion formed by the groove wall and the road contact surface of the tread portion by chamfering. "Projected area of the chamfered portions" is the area measured when the chamfered portion is projected in a normal line direction of the road contact surface of the tread portion.

In the present technology, "ground contact region" is the region on the tire circumference defined by the ground contact width. The ground contact width is the maximum linear distance in the tire axial direction of the contact surface with a flat surface when the tire is mounted on a regular rim and inflated to a regular internal pressure, and placed vertically upon a flat surface with a regular load applied thereto. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire & Rim Association, Inc.), and refers to a "measuring rim" in the case of ETRTO (The European Tyre and Rim Technical Organisation. "Regular internal pressure" is an air pressure defined by standards for each tire according to a system of standards that includes standards on which tires are based, and refers to a "maximum air pressure" in the case of JATMA, refers to the maximum value in the table of "TIRE LOAD LIMITS AT VARIOUS COLD INFLATION PRESSURES" in the case of TRA, and refers to the "INFLATION PRESSURE" in the case of ETRTO. "Regular load" is a load defined by standards for each tire according to a system of standards that includes standards on which tires are based, and refers to "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Figure 1:
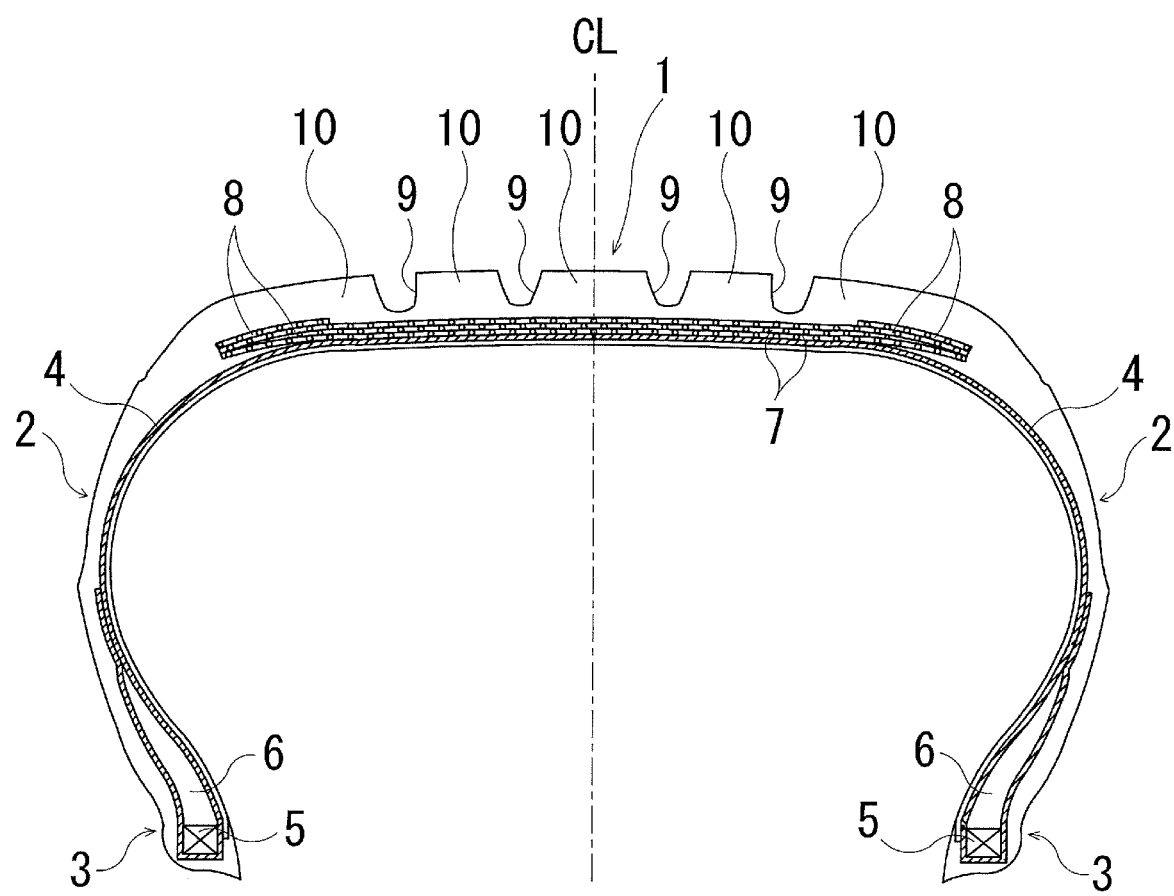
FIG. 1 is a meridian cross-sectional view illustrating a pneumatic tire according to an embodiment of the present technology.
Figure 2:
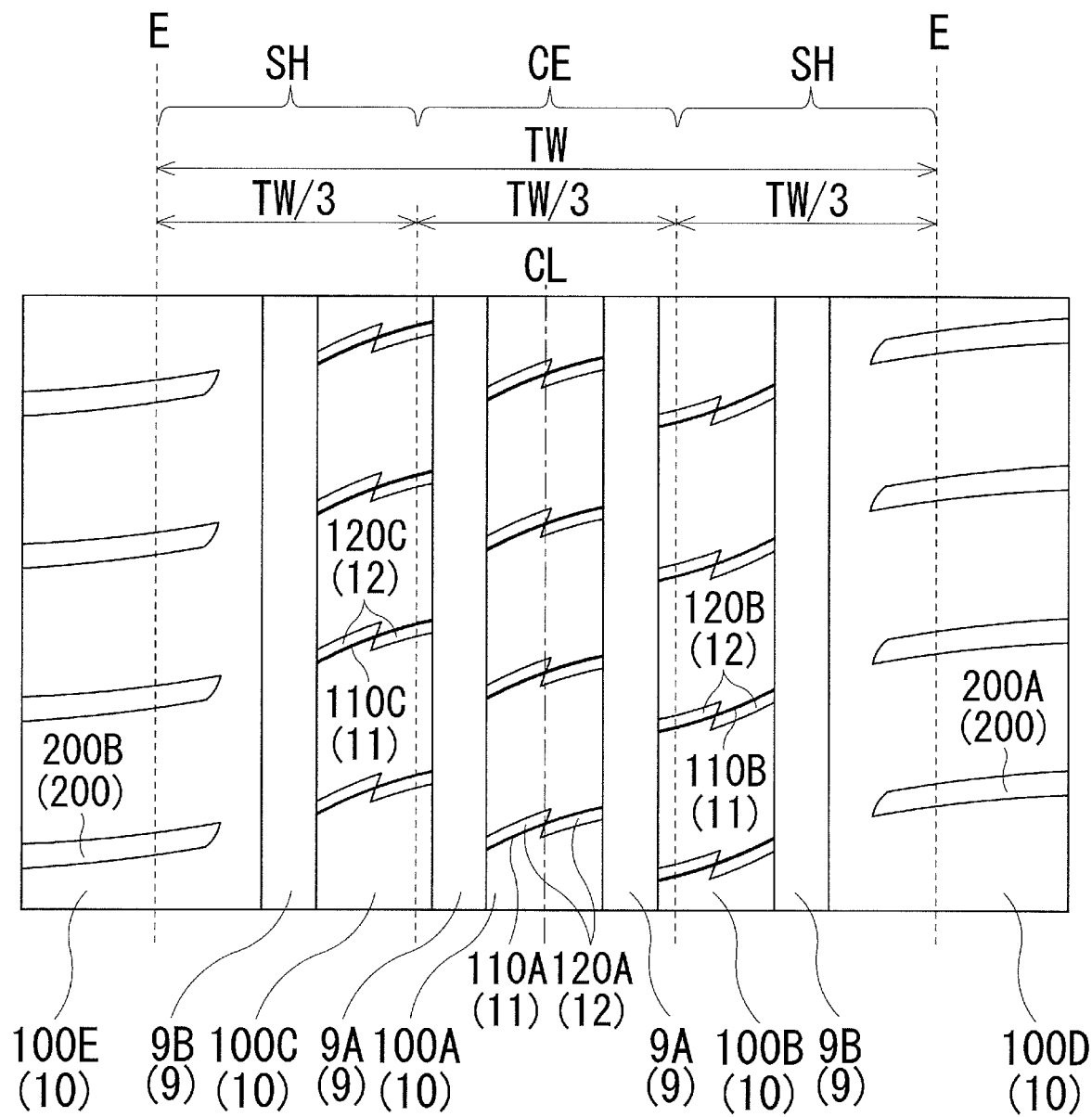
FIG. 2 is a plan view illustrating an example of a tread portion of a pneumatic tire according to the embodiment of the present technology.

Configurations of embodiments of the present technology are described in detail below with reference to the accompanying drawings. In FIGS. 1 and 2, CL denotes the tire center line. In FIG. 2, E denotes the ground contact edges, and TW denotes the ground contact width.

As illustrated in FIG. 1, a pneumatic tire according to an embodiment of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, with the reinforcing cords of the different layers arranged in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8, formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

FIG. 2 illustrates an example of a tread portion of a pneumatic tire according to an embodiment of the present technology. Four main grooves 9 extending in the tire circumferential direction are formed in a tread portion 1. The main grooves 9 includes a pair of inner main grooves 9A, 9A located on both sides of the tire center line CL and a pair of outer main grooves 9B, 9B located on the outermost side in the tire lateral direction. Ribs 10 are defined in the tread portion 1 by the four main grooves 9. The ribs 10 include a center rib 100A located on the tire center line CL, a pair of intermediate ribs 100B, 100C located outward of the center rib 100A in the tire lateral direction, and a pair of shoulder ribs 100D, 100E located outward of the intermediate ribs 100B, 100C in the tire lateral direction.

Sipes 11 including a pair of chamfered portions 12 are formed in each of the center rib 100A and the intermediate ribs 100B, 100C. The sipes 11 includes a sipe 110A disposed in the center rib 100A and sipes 110B, 110C disposed in each of the intermediate ribs 100B, 100C. The chamfered portions 12 include a chamfered portion 120A formed on the sipe 110A, a chamfered portion 120B formed on the sipe 110B, and a chamfered portion 120C formed on the sipe 110C.

The sipes 110A are inclined in the same direction with respect to the tire lateral direction and are formed at intervals in the tire circumferential direction in the center rib 100A. The sipe 110A communicates at both ends with the inner main grooves 9A. That is, the sipe 110A is an open sipe.

The sipes 110B are inclined in the same direction with respect to the tire lateral direction and are formed at intervals in the tire circumferential direction in the intermediate rib 100B. One end of the sipe 110B communicates with the inner main groove 9A, and the other end communicates with the outer main groove 9B. That is, the sipe 110B is an open sipe. The sipes 110C are inclined in the same direction with respect to the tire lateral direction and are formed at intervals in the tire circumferential direction in the intermediate rib 100C. One end of the sipe 110C communicates with the inner main groove 9A, and the other end communicates with the outer main groove 9B. That is, the sipe 110C is an open sipe.

Lug grooves 200 that do not communicate with the outer main groove 9B extend in the tire lateral direction, are inclined in the same direction with respect to the tire lateral direction, and are formed at intervals in the tire circumferential direction in the shoulder ribs 100D, 100E. The lug grooves 200 include lug grooves 200A formed in the shoulder rib 100D and lug grooves 200B formed in the shoulder rib 100E.

Figure 3:
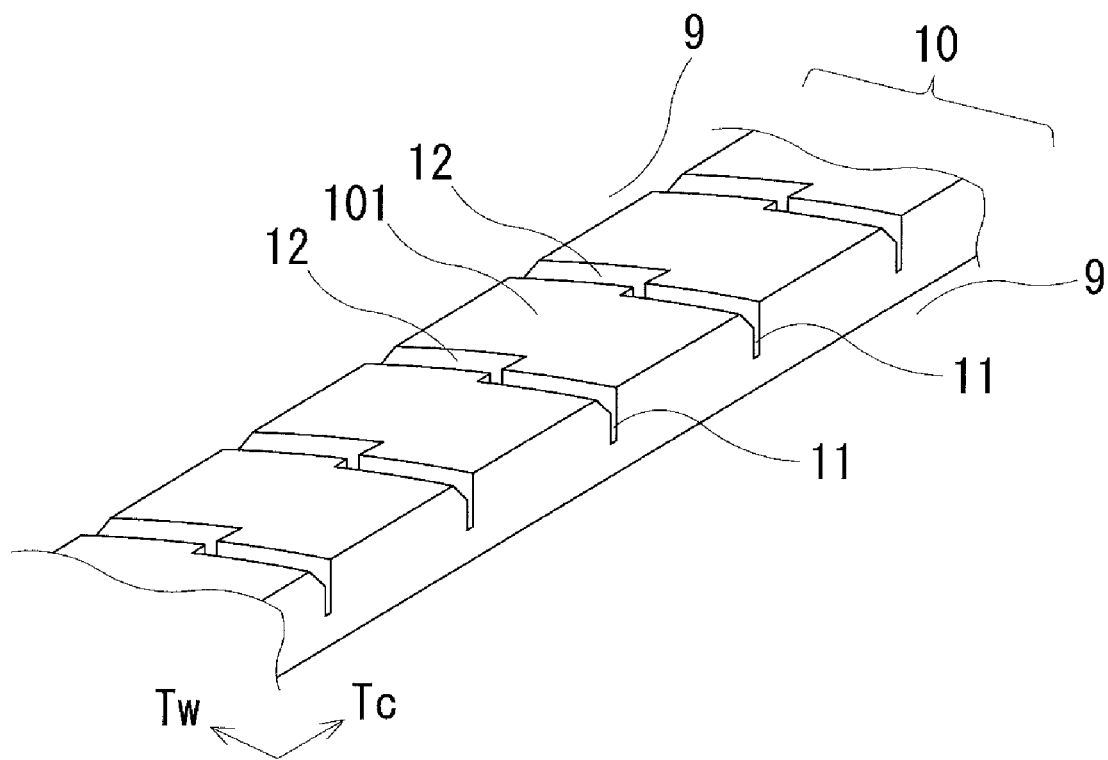
FIG. 3 is a perspective view illustrating a portion of a tread portion of a pneumatic tire according to an embodiment of the present technology.
Figure 4:
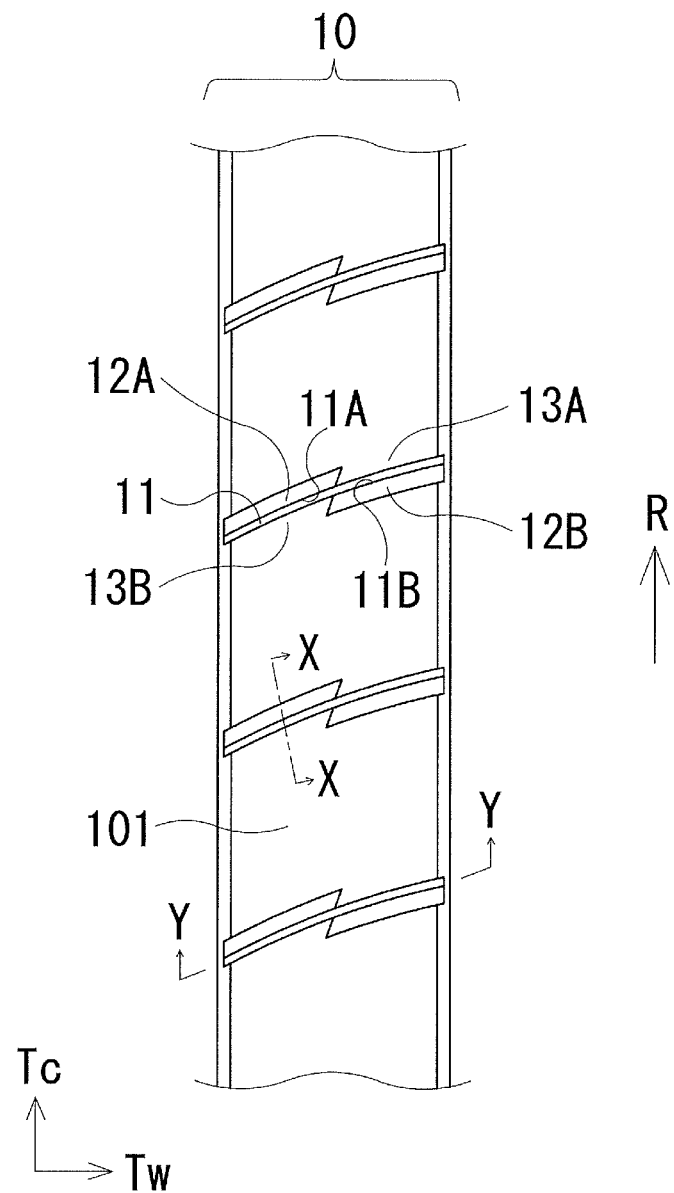
FIG. 4 is a plan view illustrating a portion of a tread portion of a pneumatic tire according to an embodiment of the present technology.
Figure 5:
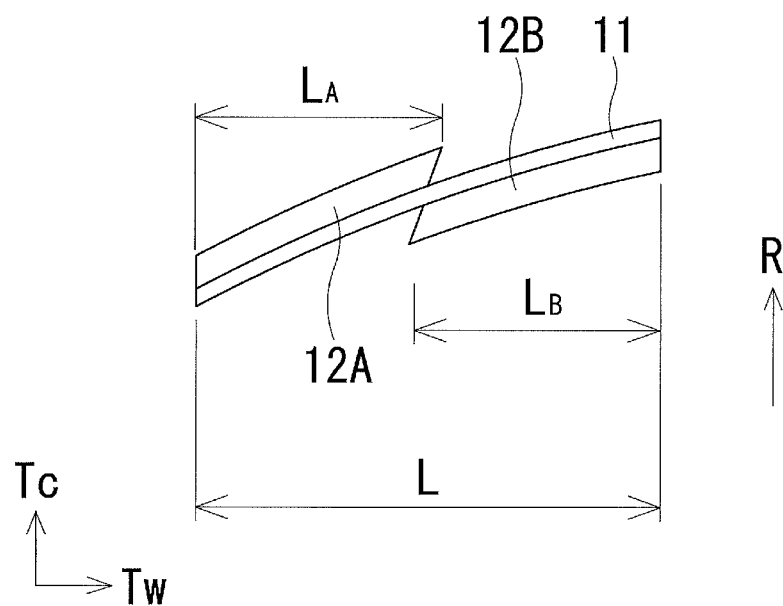
FIG. 5 is a plan view illustrating a sipe and a chamfered portion thereon formed in the tread portion of FIG. 4.

FIGS. 3 to 6 illustrate a portion of a tread portion of a pneumatic tire according to an embodiment of the present technology. In FIGS. 3 to 5, Tc indicates the tire circumferential direction and Tw indicates the tire lateral direction. As illustrated in FIG. 3, the ribs 10 include the sipes 11 extending in the tire lateral direction and blocks 101 defined by the sipes 11. The blocks 101 are provided side by side in the tire circumferential direction. The sipes 11 are narrow grooves having a groove width of 1.5 mm or less.

As illustrated in FIG. 4, the sipes 11 have an overall shape that is curved and are formed in the rib 10 at intervals in the tire circumferential direction. The sipe 11 includes an edge 11A on the leading side with respect to a rotation direction R and an edge 11B on the trailing side with respect to the rotation direction R. The chamfered portions 12 are formed on the edge 11A on the leading side and the edge 11B on the trailing side.

The chamfered portions 12 includes a chamfered portion 12A on the leading side with respect to the rotation direction R and a chamfered portion 12B on the trailing side with respect to the rotation direction R. At portions facing the chamfered portions 12, non-chamfered regions 13 in which other chamfered portions are not present, are provided. In other words, a non-chamfered region 13B on the trailing side with respect to the rotation direction R is provided at a portion facing the chamfered portion 12A, and a non-chamfered region 13A on the leading side with respect to the rotation direction R is provided at a portion facing the chamfered portion 12B. The chamfered portion 12 and the non-chamfered region 13 in which other chamfered portions are not present, are disposed adjacent to one another on the edge 11A on the leading side and the edge 11B on the trailing side of the sipe 11 in this manner.

As illustrated in FIG. 5, the lengths of the sipe 11 and the chamfered portions 12A, 12B in the tire lateral direction are defined as a sipe length L and chamfer lengths $L_A$, $L_B$, respectively. The sipe length L and the chamfer lengths $L_A$, $L_B$ are lengths in the tire lateral direction from one end portion to the other end portion for each of the sipes 11 and the chamfered portions 12A, 12B. The chamfer lengths $L_A$, $L_B$ of the chamfered portions 12A, 12B are formed shorter than the sipe length L of the sipe 11.

Figure 6:
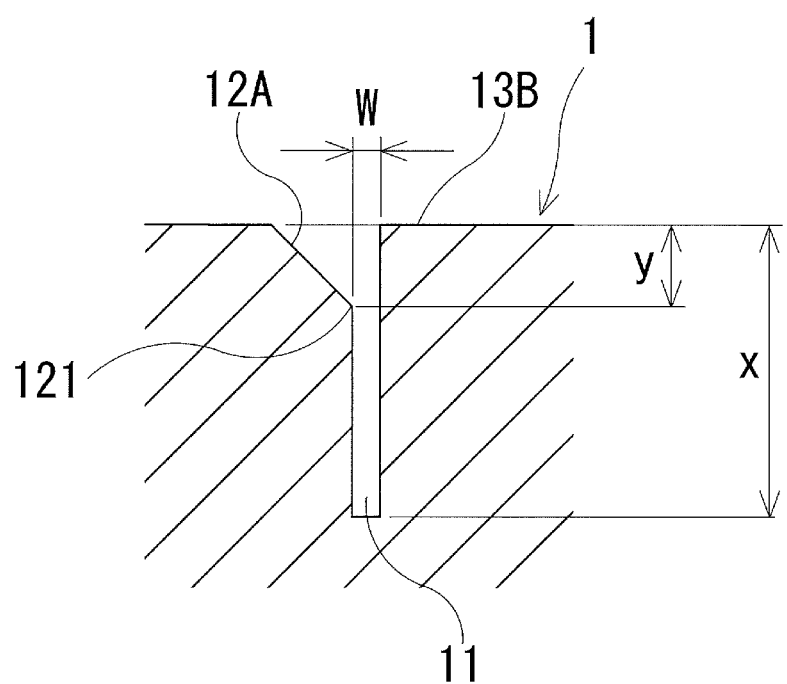
FIG. 6 is a cross-sectional view taken along line X-X in the direction of the arrow in FIG. 4.

FIG. 6 is a view orthogonal to the extension direction of the sipe 11, with the tread portion 1 cut away in the vertical direction. As illustrated in FIG. 6, the maximum depth of the sipe 11 is x (mm) and the maximum depth of the chamfered portion 12 is y (mm), and the sipe 11 and the chamfered portion 12 are formed so that the maximum depth y (mm) is less than the maximum depth x (mm). The maximum depth x of the sipe 11 is preferably from 3 mm to 8 mm.

A sipe width W of the sipe 11 is substantially constant in a range from an end portion 121 located on the inner side of the chamfered portion 12 in the tire radial direction to the groove bottom of the sipe 11. In a configuration in which a protrusion is disposed on the groove wall of the sipe 11, for example, the sipe width W does not include the height of the protrusion. Also, in a configuration in which the sipe width of the sipe 11 gradually narrows toward the groove bottom, the width of the sipe 11 is substantially measured as the sipe width not including the narrow portion.

In the pneumatic tire described above, as illustrated in FIG. 2, with the ground contact width TW being equally divided into three, the region centrally located in the tire lateral direction is defined as a center region CE, and each of the regions located on both sides of the center region CE is defined as a shoulder region SH. Here, for all of the chamfered portions, including at least the chamfered portions 12 of the sipes 11, formed on grooves other than the main grooves 9, a total volume $S_{CE}$ of all the chamfered portions provided in the center region CE and each of the total volumes $S_{SH}$ of all the chamfered portions provided in the shoulder regions SH satisfy a relationship $S_{CE}<S_{SH}$. In the embodiment of FIG. 2, since only the sipes 11 are provided with chamfered portions, all of the chamfered portions formed on grooves other than the main grooves 9 (the sipes 11 and the lug grooves 200) are configured by the chamfered portions 12, and each of the total volumes $S_{SH}$ of all of the chamfered portions 120B and the chamfered portions 120C provided in the shoulder regions SH is greater than the total volume $S_{CE}$ of all the chamfered portions 120A, 120B, 120C provided in the center region CE.

Thus, as a method for making the total volume $S_{SH}$ of all the chamfered portions provided in the shoulder region SH greater than the total volume $S_{CE}$ of all the chamfered portions provided in the center region CE, the total number of the sipes 11 provided in the shoulder regions SH can be made greater than the total number of the sipes 11 provided in the center region CE, a chamfered portion can be provided on grooves in addition to the sipe 11 (for example, a sipe or a lug groove) provided in the shoulder regions SH, and the like. Also, the cross-sectional shape of the chamfered portions 12 of the sipes 11 provided in the center region CE and the shoulder regions SH can be varied, and, as illustrated in FIGS. 7A and 7B, the volume of the chamfered portion 12 of the sipe 11 provided in the shoulder region SH can be made relatively large, and, as illustrated in FIGS. 8A and 8B, the volume of the chamfered portion 12 of the sipe 11 provided in the center region CE can be made relatively small, such that the relationship $S_{CE}<S_{SH}$ is satisfied.

Figure 7A:
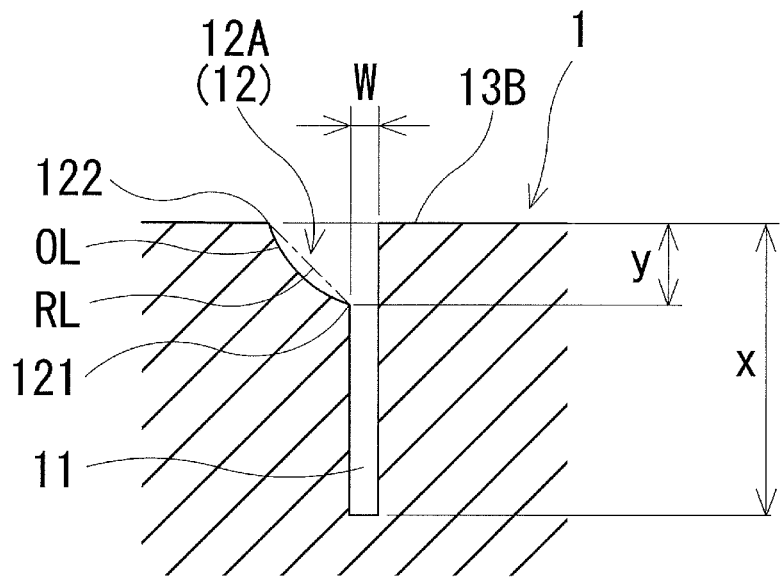
FIGS. 7A and 7B are cross-sectional views illustrating a modified example of a sipe and chamfered portions thereon formed in the tread portion of a pneumatic tire according to an embodiment of the present technology.
Figure 7B:
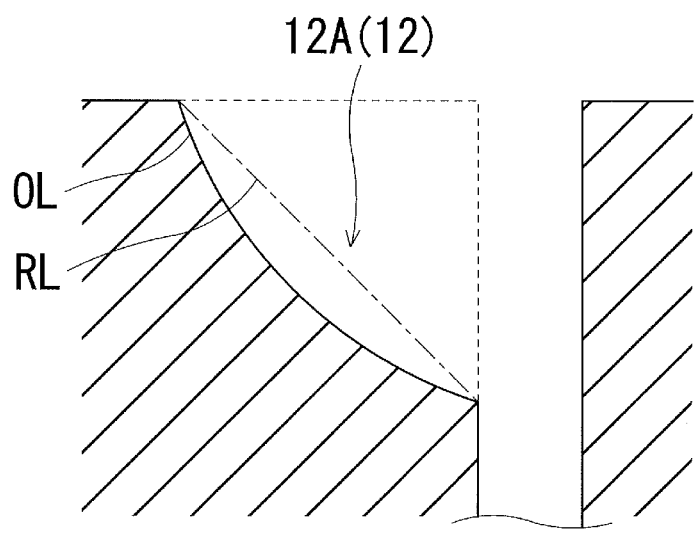

FIGS. 7A and 7B and FIGS. 8A and 8B are diagrams illustrating modified examples of sipes and chamfered portions thereon formed in the tread portion of a pneumatic tire according to an embodiment of the present technology. As illustrated in FIGS. 7A and 7B, in a cross-sectional view perpendicular to the longitudinal direction of the sipe 11, a line segment connecting the end portions 121, 122 of the chamfered portion 12 is defined as a chamfer reference line RL. Furthermore, the chamfered portion 12A and/or the chamfered portion 12B includes a profile line OL that projects further inward in the tire radial direction than the chamfer reference line RL. A region surrounded by the profile line OL, the sipe 11, and the road contact surface of the tread portion 1 is defined as a chamfer region Ra, and a region surrounded by the chamfer reference line RL, the sipe 11, and the road contact surface is defined as a reference region Rb. In other words, the fan-shaped region surrounded by the two dotted lines and the profile line OL illustrated in FIGS. 7A and 7B is the chamfer region Ra, and the triangular region surrounded by the two dotted lines and the chamfer reference line RL illustrated in FIGS. 7A and 7B is the reference region Rb. Here, a cross-sectional area a of the chamfer region Ra is equal to or greater than a cross-sectional area b of the reference region Rb. In particular, the cross-sectional area a of the chamfer region Ra is preferably greater than the cross-sectional area b of the reference region Rb.

Figure 8A:
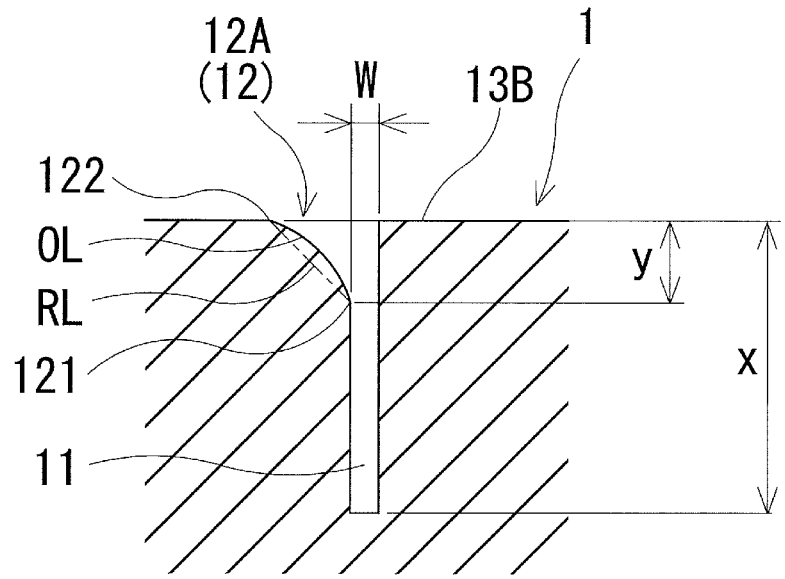
FIGS. 8A and 8B are cross-sectional views illustrating a modified example of a sipe and chamfered portions thereon formed in the tread portion of a pneumatic tire according to an embodiment of the present technology.
Figure 8B:
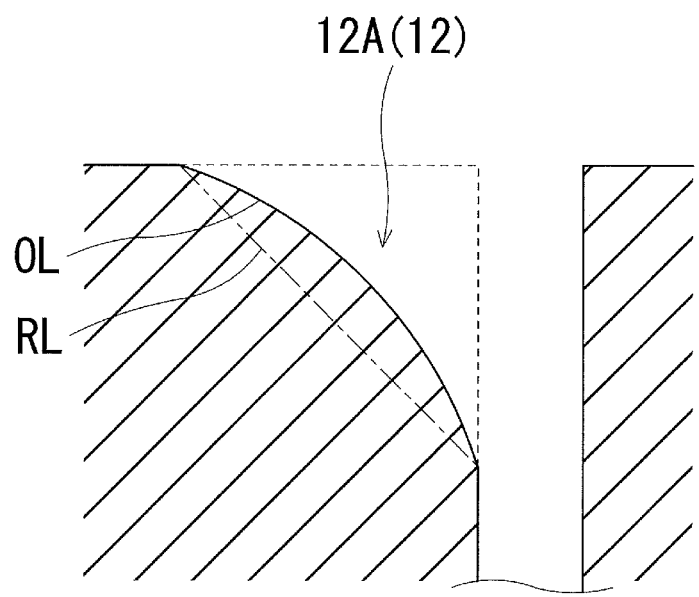

As illustrated in FIGS. 8A and 8B, in a cross-sectional view perpendicular to the longitudinal direction of the sipe 11, a line segment connecting the end portions 121, 122 of the chamfered portion 12 is defined as a chamfer reference line RL. Furthermore, the chamfered portion 12A and/or the chamfered portion 12B includes a profile line OL that projects further outward in the tire radial direction than the chamfer reference line RL. A region surrounded by the profile line OL, the sipe 11, and the road contact surface of the tread portion 1 is defined as a chamfer region Ra, and a region surrounded by the chamfer reference line RL, the sipe 11, and the road contact surface is defined as a reference region Rb. In other words, the region surrounded by the two dotted lines and the profile line OL illustrated in FIGS. 8A and 8B is the chamfer region Ra, and the triangular region surrounded by the two dotted lines and the chamfer reference line RL illustrated in FIGS. 8A and 8B is the reference region Rb. Here, a cross-sectional area a of the chamfer region Ra is less than a cross-sectional area b of the reference region Rb.

In the pneumatic tire described above, the chamfered portion 12 that is shorter than the sipe length L of the sipe 11 is provided on each of the edge 11A on the leading side and the edge 11B on the trailing side of the sipe 11, and the non-chamfered regions 13 in which other chamfered portions are not present, are disposed at the portions facing the chamfered portions 12 of the sipe 11. Thus, the drainage effect can be improved with the chamfered portions 12, and a water film can be effectively removed by the edge effect in the non-chamfered regions 13 in which the chamfered portion 12 is not provided. As a result, the steering stability performance on wet road surfaces can be greatly improved. Moreover, the chamfered portion 12 and the non-chamfered region 13 in which chamfered portions are not present, are disposed alongside each other on the edge 11A on the leading side and the edge 11B on the trailing side in this manner. Thus, the effect of enhancing wet performance as described above when braking and driving can be maximally achieved. Furthermore, for all the chamfered portions, including at least the chamfered portions 12 of the sipes 11, formed on grooves other than the main grooves 9, with the ground contact width TW being equally divided into three in the tire lateral direction, the total volume $S_{CE}$ of the chamfered portions provided in the center region CE centrally located in the tire lateral direction can be made relatively small to improve the steering stability performance on dry road surfaces, and each of the total volumes $S_{SH}$ of the chamfered portions provided in the shoulder regions SH located on either side of the center region CE can be made relatively large to improve the steering stability performance on wet road surfaces. As a result, the steering stability performance on dry road surfaces and the steering stability performance on wet road surfaces can be enhanced in a well-balanced manner.

In the pneumatic tire described above, the maximum depth x (mm) and the maximum depth y (mm) preferably satisfy the relationship of Formula (1) below. By providing the sipes 11 and the chamfered portions 12 so as to satisfy the relationship of Formula (1) below, compared to a known chamfered sipe, the chamfered area can be minimized, so the steering stability performance on dry road surfaces can be improved. As a result, the steering stability performance on dry road surfaces and the steering stability performance on wet road surfaces can be improved in a compatible manner. Here, when $y<x\times0.1$ is true, the drainage effect from the chamfered portions 12 is insufficient, and when $y>x\times0.3+1.0$ is true, the rigidity of the rib 10 is reduced, leading to a reduction in the steering stability performance on dry road surfaces. In particular, the relationship $y \leq x\times0.3+0.5$ is preferably satisfied.

$$x\times0.1 \leq y \leq x\times0.3+1.0 \quad (1)$$

For all the chamfered portions described above, the total volume $S_{CE}$ of the chamfered portions provided in the center region CE and each of the total volumes $S_{SH}$ of the chamfered portions provided in the shoulder regions SH preferably satisfy the following Formula (2). More preferably, the range is from 30% to 100%. By appropriately setting the total volume difference between the total volume $S_{CE}$ of all the chamfered portions provided in the center region CE and each of the total volumes $S_{SH}$ of all the chamfered portions provided in the shoulder regions SH in this manner, both steering stability performance on dry road surfaces and steering stability performance on wet road surfaces can be enhanced.

$$10\% \leq (S_{SH} - S_{CE})/S_{CE} \times 100\% \leq 200\% \quad (2)$$

Meanwhile, for all the chamfered portions described above, a total projected area $A_{CE}$ of the chamfered portions provided in the center region CE and each of total projected areas $A_{SH}$ of the chamfered portions provided in the shoulder regions SH preferably satisfy the relationship $A_{CE} \geq A_{SH}$. The shoulder regions SH are large contributors to noise performance. Thus, by the total projected areas $A_{SH}$ of all the chamfered portions provided in the shoulder regions SH being relatively small, the ground contact pressure of the shoulder regions SH being small, and the total volume $S_{SH}$ of all the chamfered portions provided in the shoulder region SH being large, improvement in noise performance and improvement in steering stability performance on wet road surfaces can be achieved in a compatible manner.

In particular, for all the chamfered portions described above, the total projected area $A_{CE}$ of the chamfered portions provided in the center region CE and each of the total projected areas $A_{SH}$ of the chamfered portions provided in the shoulder regions SH preferably satisfy the following Formula (3). More preferably, the range is from 3% to 8%. By appropriately setting the total projected area $A_{CE}$ of all the chamfered portions provided in the center region CE and the total projected areas $A_{SH}$ of all the chamfered portions provided in the shoulder regions SH in this manner, the steering stability performance on dry road surfaces, the steering stability performance on wet road surfaces, and noise performance can be enhanced in a well-balanced manner.

$$1\% \leq (A_{CE} - A_{SH})/A_{CE} \times 100\% \leq 10\% \quad (3)$$

In the pneumatic tire described above, the sipes 11 are preferably disposed in two or more of the ribs 10 of the plurality of ribs 10 defined by the main grooves 9. With the sipes 11 being disposed in two or more of the ribs 10 in this manner, the steering stability performance on dry road surfaces and the steering stability performance on wet road surfaces can be enhanced in a well-balanced manner.

In particular, all the chamfered portions including at least the chamfered portions 12 of the sipes 11, which are chamfered portions formed on grooves other than the main grooves 9, are preferably configured by the chamfered portion 12 of the sipe 11. In such a case, a total volume difference $(S_{SH} - S_{CE})$ between the total volume $S_{CE}$ of all the chamfered portions provided in the center region CE and the total volume $S_{SH}$ of all the chamfered portions provided in the shoulder region SH is the same as a total volume difference $(S_{SH}' - S_{CE}')$ between a total volume $S_{CE}'$ of the chamfered portions 12 of the sipes 11 provided in the center region CE and a total volume $S_{SH}'$ of the chamfered portions 12 of the sipes 11 provided in the shoulder region SH. With all of the chamfered portions described above being configured by the chamfered portion 12 in this manner, the steering stability performance on dry road surfaces and the steering stability performance on wet road surfaces can be enhanced in a well-balanced manner.

Figure 9:
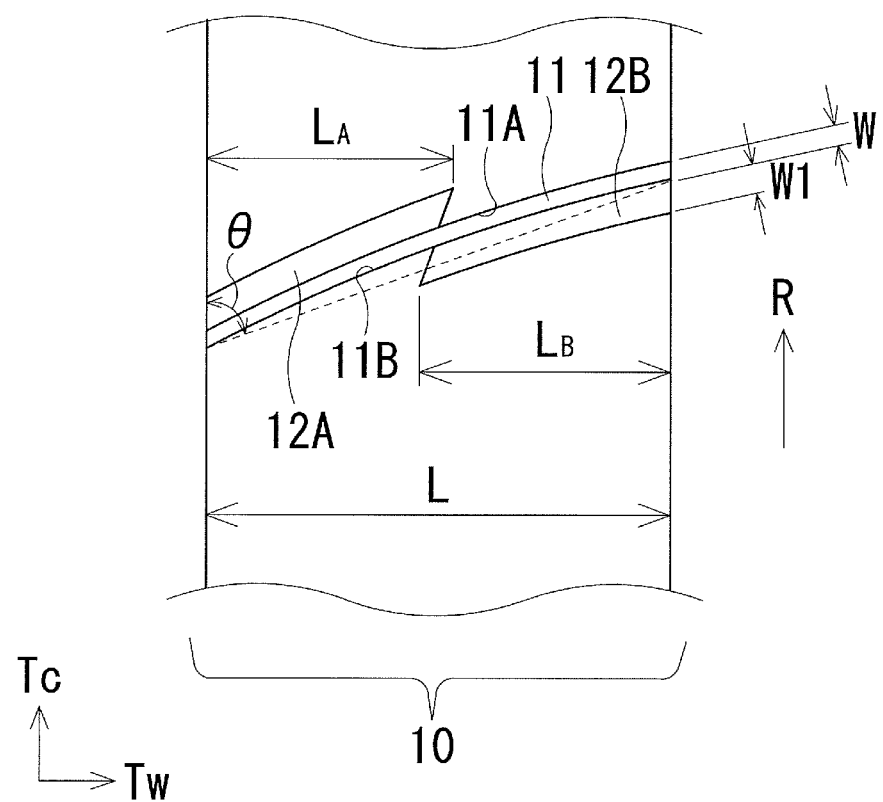
FIG. 9 is a plan view illustrating another modified example of a sipe and chamfered portions thereon of a pneumatic tire according to an embodiment of the present technology.

FIG. 9 is a diagram illustrating another modified example of a sipe and chamfered portions thereon formed in the tread portion of a pneumatic tire according to an embodiment of the present technology. The sipe 11 illustrated in FIG. 9 is formed with an inclination angle θ with respect to the tire circumferential direction. This inclination angle θ refers to the angle formed by an imaginary line (the dotted line illustrated in FIG. 9) connecting both end portions of the sipe 11 and the side surface of the block 101. The inclination angle θ has an inclination angle on the acute angle side and an inclination angle on the obtuse angle side. In FIG. 9, the inclination angle θ on the acute angle side is illustrated. The inclination angle θ is the inclination angle of the sipe 11 at the intermediate pitch within the rib 10. Here, the inclination angle θ on the acute angle side is preferably from 40° to 80°, and more preferably from 50° to 70°. With the sipe 11 being inclined with respect to the tire circumferential direction in this way, pattern rigidity can be improved, and the steering stability performance on dry road surfaces can be further improved. Here, when the inclination angle θ is less than 40°, uneven wear resistance performance is degraded. When the inclination angle θ exceeds 80°, pattern rigidity cannot be sufficiently improved.

In an embodiment of the present technology, the side having the inclination angle θ on the acute angle side of the sipe 11 is defined as the acute angle side, and the side having the inclination angle θ on the obtuse angle side of the sipe 11 is defined as the obtuse angle side. The chamfered portions 12A, 12B formed on the edges 11A, 11B of the sipe 11 are formed on the acute angle side of the sipe 11. With the sipe 11 being chamfered on the acute angle side in this manner, uneven wear resistance performance can be further enhanced. Alternatively, the chamfered portions 12A, 12B may be formed on the obtuse angle side of the sipe 11. With the chamfered portion 12 being formed on the obtuse angle side of the sipe 11 in this manner, the edge effect is increased, and the steering stability performance on wet road surfaces can be further improved.

In the present technology, the overall shape of the sipe 11 described above is curved, allowing the steering stability performance on wet road surfaces to be improved. However, a portion of the sipe 11 may have a curved or bent shape in a plan view. With the sipe 11 being formed in this manner, the total amount of edges 11A, 11B of the sipes 11 is increased, and the steering stability performance on wet road surfaces can be improved.

As illustrated in FIG. 9, one chamfered portion 12 is disposed on each of the edge 11A on the leading side and the edge 11B on the trailing side of the sipe 11. By the chamfered portions 12 being disposed in this manner, uneven wear resistance performance can be improved. Here, when two or more chamfered portions 12 are formed in each of the edge 11A on the leading side and the edge 11B on the trailing side of the sipe 11, the number of nodes increases, which tends to deteriorate uneven wear resistance performance.

The maximum width of the chamfered portion 12 measured in the direction orthogonal to the sipe 11 is defined as a width W1. The maximum width W1 of the chamfered portion 12 is preferably from 0.8 times to 5.0 times the sipe width W of the sipe 11, and more preferably from 1.2 times to 3.0 times. With the maximum width W1 of the chamfered portion 12 being appropriately set with respect to the sipe width W in this manner, the steering stability performance on dry road surfaces and the steering stability performance on wet road surfaces can be improved in a compatible manner. When the maximum width W1 of the chamfered portion 12 is less than 0.8 times the sipe width W of the sipe 11, the steering stability performance on wet road surfaces cannot be sufficiently improved, and when the maximum width W1 is greater than 5.0 times the sipe width W, the steering stability performance on dry road surfaces cannot be sufficiently improved.

Furthermore, the outer edge portion in the longitudinal direction of the chamfered portion 12 is formed parallel with the extension direction of the sipe 11. With the chamfered portion 12 extending parallel with the sipe 11 in this way, uneven wear resistance performance can be improved, and the steering stability performance on dry road surfaces and the steering stability performance on wet road surfaces can be improved in a compatible manner.

As illustrated in FIG. 9, end portions of the chamfered portions 12A, 12B located near the main grooves 9 communicate with the main grooves 9 located on either side of the rib 10. With the chamfered portions 12A, 12B being formed in this manner, the steering stability performance on wet road surfaces can be further improved. Alternatively, the end portions of the chamfered portions 12A, 12B located near the main grooves 9 may terminate within the rib 10 without communicating with the main grooves 9. With the chamfered portions 12A, 12B being formed in this manner, the steering stability performance on dry road surfaces can be further improved.

Figure 10A:
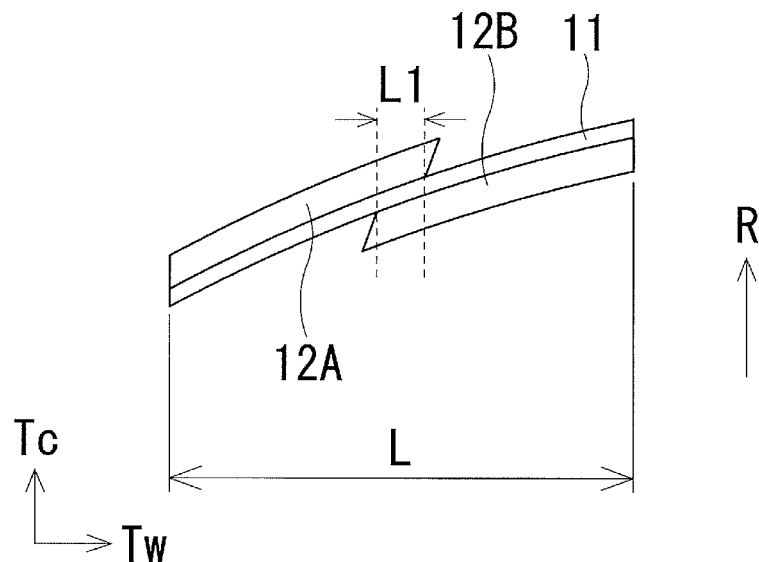
FIGS. 10A and 10B are plan views illustrating another modified example of a sipe and chamfered portions thereon of a pneumatic tire according to an embodiment of the present technology.
Figure 10B:
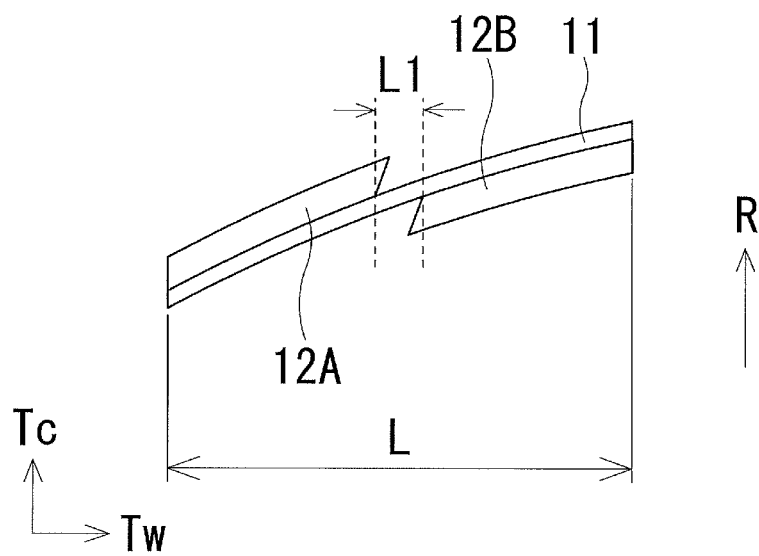

FIGS. 10A and 10B are diagrams illustrating another modified example of a sipe and chamfered portions thereon formed in the tread portion of a pneumatic tire according to an embodiment of the present technology. As illustrated in FIG. 10A, the chamfered portion 12A and the chamfered portion 12B are formed so that a portion of both of the chamfered portions 12A, 12B overlap in a central portion of the sipe 11. Here, the length in the tire lateral direction of the overlapping portion, which is a portion where the chamfered portion 12A and the chamfered portion 12B overlap, is defined as an overlap length L1. On the other hand, as illustrated in FIG. 10B, when a portion of both the chamfered portion 12A and the chamfered portion 12B do not overlap and are separated by a certain interval, the proportion of the overlap length L1 with respect to the sipe length L is expressed as a negative value. The overlap length L1 of the overlapping portion is preferably from −30% to 30% of the sipe length L, and more preferably from −15% to 15%. With the overlap length L1 of the chamfered portion 12 being appropriately set with respect to the sipe length L in this manner, the steering stability performance on dry road surfaces and the steering stability performance on wet road surfaces can be improved in a compatible manner. Here, when the overlap length L1 is greater than 30%, the steering stability performance on dry road surfaces is not sufficiently improved, and when the overlap length L1 is less than −30%, the steering stability performance on wet road surfaces is not sufficiently improved.

Figure 11:
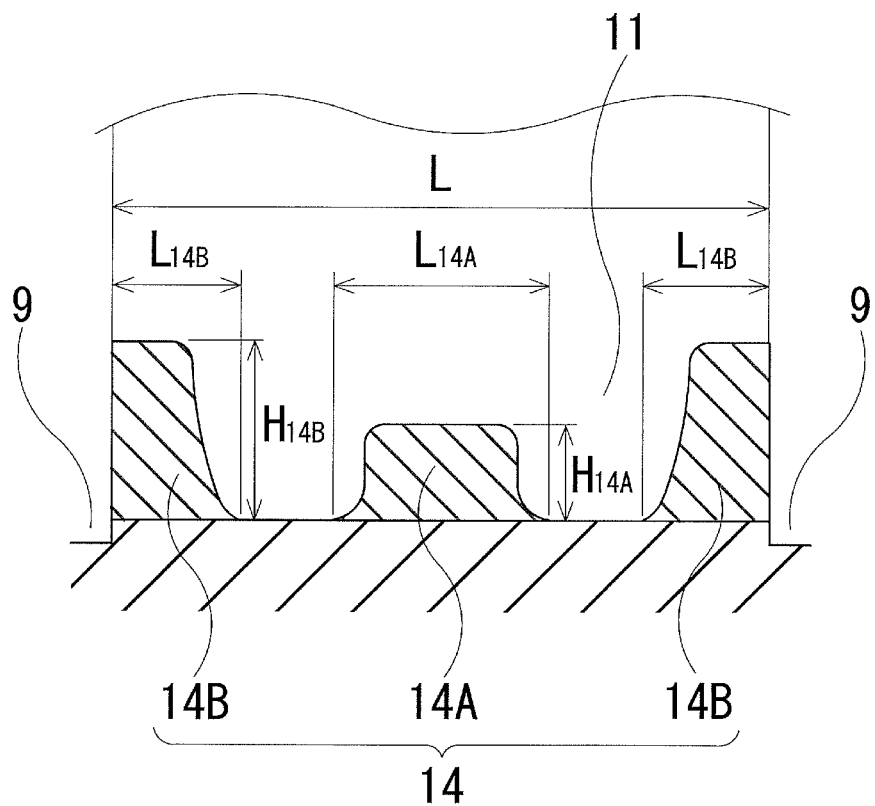
FIG. 11 is a cross-sectional view taken along line Y-Y in the direction of the arrow of FIG. 4.

FIG. 11 is a view of the sipe cut away in the extension direction. As illustrated in FIG. 11, the sipe 11 includes a raised bottom portion 14 in a portion of the sipe 11 in the length direction. As the raised bottom portion 14, a raised bottom portion 14A located in the central portion of the sipe 11 and raised bottom portions 14B located at both end portions of the sipe 11 are present. By providing the raised bottom portion 14 in the sipe 11 in this manner, the steering stability performance on dry road surfaces and the steering stability performance on wet road surfaces can be improved in a compatible manner. The raised bottom portion 14 of the sipe 11 may be formed at the end portion and/or not at the end portion of the sipe 11.

The height in the tire radial direction of the raised bottom portion 14 formed in the sipe 11 is defined as a height H14. For the raised bottom portion 14A formed not at the end portion of the sipe 11, the maximum height from the groove bottom of the sipe 11 to the top surface of the raised bottom portion 14A is defined as a height $H_{14A}$. The height $H_{14A}$ is preferably from 0.2 times to 0.5 times the maximum depth x of the sipe 11, and more preferably from 0.3 times to 0.4 times. By setting the height $H_{14A}$ of the raised bottom portion 14A disposed not at the end portion of the sipe 11 to a suitable height, the rigidity of the block 101 can be improved and the drainage effect can be maintained. As a result, the steering stability performance on wet road surfaces can be improved. Here, when the height $H_{14A}$ is less than 0.2 times the maximum depth x of the sipe 11, the rigidity of the block 101 cannot be sufficiently improved, and when the height $H_{14A}$ is greater than 0.5 times the maximum depth x of the sipe 11, the steering stability performance on wet road surfaces cannot be sufficiently improved.

For the raised bottom portions 14B formed at both end portions of the sipe 11, the maximum height from the groove bottom of the sipe 11 to the top surface of the raised bottom portion 14B is defined as a height $H_{14B}$. The height $H_{14B}$ is preferably from 0.6 times to 0.9 times the maximum depth x of the sipe 11, and more preferably from 0.7 times to 0.8 times. By setting the height $H_{14B}$ of the raised bottom portions 14B disposed at the end portions of the sipe 11 to a suitable height, the rigidity of the block 101 can be improved and the steering stability performance on dry road surfaces can be improved. Here, when the height $H_{14B}$ is less than 0.6 times the maximum depth x of the sipe 11, the rigidity of the block 101 cannot be sufficiently improved, and when the height $H_{14B}$ is greater than 0.9 times the maximum depth x of the sipe 11, the steering stability performance on wet road surfaces cannot be sufficiently improved.

The length in the tire lateral direction of the raised bottom portion 14 of the sipe 11 is defined as a raised bottom length L14. The raised bottom lengths $L_{14A}$, $L_{14B}$ of the raised bottom portions 14A, 14B is preferably from 0.3 times to 0.7 times the sipe length L, and more preferably from 0.4 times to 0.6 times.

With the raised bottom lengths $L_{14A}$, $L_{14B}$ of the raised bottom portions 14A, 14B being appropriately set in this manner, the steering stability performance on dry road surfaces and the steering stability performance on wet road surfaces can be improved in a compatible manner.

Examples

Tires according to Conventional Examples 1, 2 and Examples 1 to 7 were manufactured. The tires have a tire size of 245/40R19 and include, in a tread portion, main grooves extending in the tire circumferential direction and sipes extending in the tire lateral direction disposed in ribs defined by the main grooves. Also, the tires are set according to Tables 1 and 2 for the following: chamfer arrangement (both sides or one side), size relationship between sipe length L and chamfer lengths $L_A$, $L_B$, chamfer provided at portion facing chamfered portion, size relationship between total volume $S_{CE}$ of all chamfered portions in center region and total volume $S_{SH}$ of all chamfered portions in shoulder region, sipe width, total volume difference between all chamfered portions in center region and all chamfered portions in shoulder region (($S_{SH}$–$S_{CE}$)/$S_{CE}$×100%), number of ribs with sipes including chamfered portions, total volume difference between chamfered portions of sipes in center region and chamfered portions of sipes in shoulder regions (($S_{SH}'$–$S_{CE}'$)/$S_{CE}'$×100%), size relationship between total projected area $A_{CE}$ of all chamfered portions in center region and total projected area $A_{SH}$ of all chamfered portions in shoulder region, and total projected area difference between all chamfered portion in center region and all chamfered portions in shoulder region (($A_{CE}$–$A_{SH}$)/$A_{CE}$×100%).

Note that in Tables 1 and 2, when the value of the "total volume difference between all chamfered portions in center region and all chamfered portions in shoulder region" is the same as the value of the "total volume difference between chamfered portions of sipes in center region and chamfered portions of sipes in shoulder region", this means that all the chamfered portions including at least the chamfered portions of the sipes, which are chamfered portions formed on grooves other than main grooves, are configured by the chamfered portion of the sipe.

These test tires underwent a sensory evaluation by a test driver for steering stability performance on dry road surfaces and steering stability performance on wet road surfaces and a sensory evaluation for noise performance. The results thereof are shown in Tables 1 and 2.

Sensory evaluation for steering stability performance on dry road surfaces and steering stability performance on wet road surfaces was performed with the test tires on a wheel with a rim size of 19×8.5 J mounted on a vehicle and inflated to an air pressure of 260 kPa. Evaluation results are expressed as index values, with the results of Conventional Example 1 being assigned as an index value of 100. Larger index values indicate superior steering stability performance on dry road surfaces and steering stability performance on wet road surfaces.

Sensory evaluation for noise performance was performed with the test tires on a wheel with a rim size of 19×8.5 J mounted on a vehicle and inflated to an air pressure of 260 kPa. Evaluation results are expressed as index values, with the results of Conventional Example 1 being assigned an index value of 100. Larger index values indicate superior noise performance.

TABLE 1

|  | Conventional Example 1 | Conventional Example 2 |
|---|---|---|
| Chamfer arrangement (both sides or one side) | Both sides | One side |
| Size relationship between sipe length L and chamfer lengths $L_A$, $L_B$ | L = $L_A$, $L_B$ | L = $L_A$ |
| Chamfer provided at portion facing chamfered portion | Yes | No |
| Size relationship between total volume $S_{CE}$ of all chamfered portions in center region and total volume $S_{SH}$ of all chamfered portions in shoulder region | $S_{CE}$ = $S_{SH}$ | $S_{CE}$ = $S_{SH}$ |
| Sipe width | Constant | Changes |
| Total volume difference between all chamfered portions in center region and all chamfered portions in shoulder region (($S_{SH}$ – $S_{CE}$)/$S_{CE}$ × 100%) | 0% | 0% |
| Number of ribs with sipes including chamfered portions | 1 | 1 |
| Total volume difference between chamfered portions of sipes in center region and chamfered portions of sipes in shoulder region (($S_{SH}'$ – $S_{CE}'$)/$S_{CE}'$ × 100%) | 0% | 0% |
| Size relationship between total projected area $A_{CE}$ of all chamfered portions in center region and total projected area $A_{SH}$ of all chamfered portions in shoulder region | $A_{CE}$ < $A_{SH}$ | $A_{CE}$ < $A_{SH}$ |
| Total projected area difference between all chamfered portions in center region and all chamfered portions in shoulder region (($A_{CE}$ – $A_{SH}$)/$A_{CE}$ × 100%) | –5% | –5% |
| Steering stability performance on dry road surfaces | 100 | 90 |
| Steering stability performance on wet road surfaces | 100 | 105 |
| Noise performance | 100 | 100 |

|  | Example 1 | Example 2 | Example 3 |
|---|---|---|---|
| Chamfer arrangement (both sides or one side) | Both sides | Both sides | Both sides |
| Size relationship between sipe length L and chamfer lengths $L_A$, $L_B$ | L > $L_A$, $L_B$ | L > $L_A$, $L_B$ | L > $L_A$, $L_B$ |
| Chamfer provided at portion facing chamfered portion | No | No | No |
| Size relationship between total volume $S_{CE}$ of all chamfered portions in center region and total volume $S_{SH}$ of all chamfered portions in shoulder region | $S_{CE}$ < $S_{SH}$ | $S_{CE}$ < $S_{SH}$ | $S_{CE}$ < $S_{SH}$ |
| Sipe width | Changes | Constant | Constant |
| Total volume difference between all chamfered portions in center region and | 5% | 5% | 60% |

TABLE 1-continued

| | | | |
|---|---|---|---|
| all chamfered portions in shoulder region $((S_{SH} - S_{CE})/S_{CE} \times 100\%)$ | | | |
| Number of ribs with sipes including chamfered portions | 1 | 1 | 1 |
| Total volume difference between chamfered portions of sipes in center region and chamfered portions of sipes in shoulder region $((S_{SH}' - S_{CE}')/S_{CE}' \times 100\%)$ | 5% | 5% | 5% |
| Size relationship between total projected area $A_{CE}$ of all chamfered portions in center region and total projected area $A_{SH}$ of all chamfered portions in shoulder region | $A_{CE} < A_{SH}$ | $A_{CE} < A_{SH}$ | $A_{CE} < A_{SH}$ |
| Total projected area difference between all chamfered portions in center region and all chamfered portions in shoulder region $((A_{CE} - A_{SH})/A_{CE} \times 100\%)$ | −5% | −5% | −5% |
| Steering stability performance on dry road surfaces | 105 | 106 | 107 |
| Steering stability performance on wet road surfaces | 105 | 106 | 107 |
| Noise performance | 100 | 100 | 100 |

TABLE 2

| | Example 4 | Example 5 |
|---|---|---|
| Chamfer arrangement (both sides or one side) | Both sides | Both sides |
| Size relationship between sipe length L and chamfer lengths $L_A$, $L_B$ | $L > L_A, L_B$ | $L > L_A, L_B$ |
| Chamfer provided at portion facing chamfered portion | No | No |
| Size relationship between total volume $S_{CE}$ of all chamfered portions in center region and total volume $S_{SH}$ of all chamfered portions in shoulder region | $S_{CE} < S_{SH}$ | $S_{CE} < S_{SH}$ |
| Sipe width | Constant | Constant |
| Total volume difference between all chamfered portions in center region and all chamfered portions in shoulder region $((S_{SH} - S_{CE})/S_{CE} \times 100\%)$ | 60% | 60% |
| Number of ribs with sipes including chamfered portions | 3 | 3 |
| Total volume difference between chamfered portions of sipes in center region and chamfered portions of sipes in shoulder region $((S_{SH}' - S_{CE}')/S_{CE}' \times 100\%)$ | 5% | 60% |
| Size relationship between total projected area $A_{CE}$ of all chamfered portions in center region and total projected area $A_{SH}$ of all chamfered portions in shoulder region | $A_{CE} < A_{SH}$ | $A_{CE} < A_{SH}$ |
| Total projected area difference between all chamfered portions in center region and all chamfered portions in shoulder region $((A_{CE} - A_{SH})/A_{CE} \times 100\%)$ | −5% | −5% |
| Steering stability performance on dry road surfaces | 108 | 109 |
| Steering stability performance on wet road surfaces | 108 | 109 |
| Noise performance | 100 | 100 |

| | Example 6 | Example 7 |
|---|---|---|
| Chamfer arrangement (both sides or one side) | Both sides | Both sides |
| Size relationship between sipe length L and chamfer lengths $L_A$, $L_B$ | $L > L_A, L_B$ | $L > L_A, L_B$ |
| Chamfer provided at portion facing chamfered portion | No | No |
| Size relationship between total volume $S_{CE}$ of all chamfered portions in center region and total volume $S_{SH}$ of all chamfered portions in shoulder region | $S_{CE} < S_{SH}$ | $S_{CE} < S_{SH}$ |
| Sipe width | Constant | Constant |
| Total volume difference between all chamfered portions in center region and all chamfered portions in shoulder region $((S_{SH} - S_{CE})/S_{CE} \times 100\%)$ | 60% | 60% |
| Number of ribs with sipes including chamfered portions | 3 | 3 |

TABLE 2-continued

| | | |
|---|---|---|
| Total volume difference between chamfered portions of sipes in center region and chamfered portions of sipes in shoulder region (($S_{SH}'$ − $S_{CE}'$)/$S_{CE}'$ × 100%) | 60% | 60% |
| Size relationship between total projected area $A_{CE}$ of all chamfered portions in center region and total projected area $A_{SH}$ of all chamfered portions in shoulder region | $A_{CE} = A_{SH}$ | $A_{CE} > A_{SH}$ |
| Total projected area difference between all chamfered portions in center region and all chamfered portions in shoulder region (($A_{CE}$ − $A_{SH}$)/$A_{CE}$ × 100%) | 0% | 6% |
| Steering stability performance on dry road surfaces | 107 | 109 |
| Steering stability performance on wet road surfaces | 107 | 109 |
| Noise performance | 103 | 105 |

As can be seen from Tables 1 and 2, by devising the shape of the chamfered portions formed on the sipes, the tires of Examples 1 to 7 have both enhanced steering stability performance on dry road surfaces and enhanced steering stability performance on wet road surfaces. Additionally, the noise performance of the tires of Examples 6 and 7 was also enhanced.

The invention claimed is:

1. A pneumatic tire, comprising:
in a tread portion, main grooves extending in a tire circumferential direction; and
a sipe extending in a tire lateral direction disposed in ribs defined by the main grooves; wherein
the sipe comprises an edge on a leading side and an edge on a trailing side;
the edge on the leading side and the edge on the trailing side each comprise a chamfered portion shorter than a sipe length of the sipe;
a non-chamfered region in which other chamfered portions are not present is provided at portions facing the chamfered portions of the sipe;
for all chamfered portions, comprising at least the chamfered portions of the sipe, formed on grooves other than the main grooves, with a ground contact width being equally divided into three in the tire lateral direction, a total volume $S_{CE}$ of chamfered portions provided in a center region centrally located in the tread portion in the tire lateral direction and each of total volumes $S_{SH}$ of chamfered portions provided in shoulder regions located on either side of the center region satisfy a relationship $S_{CE} < S_{SH}$; and
for all chamfered portions, a total projected area $A_{CE}$ of the chamfered portions provided in the center region and each of total projected areas $A_{SH}$ of the chamfered portions provided in the shoulder regions satisfy a relationship $A_{CE} \geq A_{SH}$.

2. The pneumatic tire according to claim 1, wherein for all chamfered portions, the total projected area $A_{CE}$ of the chamfered portions provided in the center region and each of the total projected areas $A_{SH}$ of the chamfered portions provided in the shoulder regions satisfy a relationship 1% ≤ ($A_{CE}$−$A_{SH}$)/$A_{CE}$×100% ≤ 10%.

3. A pneumatic tire, comprising:
in a tread portion, main grooves extending in a tire circumferential direction; and
a sipe extending in a tire lateral direction disposed in ribs defined by the main grooves; wherein
the sipe comprises an edge on a leading side and an edge on a trailing side;
the edge on the leading side and the edge on the trailing side each comprise a chamfered portion shorter than a sipe length of the sipe, only one of the chamfered portions being present on each of the leading side and the trailing side;
a non-chamfered region in which other chamfered portions are not present is provided at portions facing the chamfered portions of the sipe;
for all chamfered portions, comprising at least the chamfered portions of the sipe, formed on grooves other than the main grooves, with a ground contact width being equally divided into three in the tire lateral direction, a total volume $S_{CE}$ of chamfered portions provided in a center region centrally located in the tread portion in the tire lateral direction and each of total volumes $S_{SH}$ of chamfered portions provided in shoulder regions located on either side of the center region satisfy a relationship $S_{CE} < S_{SH}$; and
for all chamfered portions, a total projected area $A_{CE}$ of the chamfered portions provided in the center region and each of total projected areas $A_{SH}$ of the chamfered portions provided in the shoulder regions satisfy a relationship $A_{CE} \geq ASH$.

4. The pneumatic tire according to claim 3, wherein
a maximum depth x (mm) of the sipe and a maximum depth y (mm) of the chamfered portions satisfy a relationship x×0.1 ≤ y ≤ x×0.3+1.0; and
a sipe width of the sipe is constant in a range from an end portion located on an inner side in a tire radial direction of each chamfered portion to a groove bottom of the sipe.

5. The pneumatic tire according to claim 3, wherein for all chamfered portions, the total volume $S_{CE}$ of the chamfered portions provided in the center region and each of the total volumes $S_{SH}$ of the chamfered portions provided in the shoulder regions satisfy a relationship 10% ≤ ($S_{SH}$−$S_{CE}$)/$S_{CE}$×100% ≤ 200%.

6. The pneumatic tire according to claim 3, wherein the sipe is disposed in two or more ribs of the ribs defined by the main grooves.

7. The pneumatic tire according to claim 6, wherein all chamfered portions are configured by the chamfered portions of the sipe.

8. The pneumatic tire according to claim 4, wherein for all chamfered portions, the total volume $S_{CE}$ of the chamfered portions provided in the center region and each of the total volumes $S_{SH}$ of the chamfered portions provided in the shoulder regions satisfy a relationship 10% ≤ ($S_{SH}$−$S_{CE}$)/$S_{CE}$×100% ≤ 200%.

9. The pneumatic tire according to claim 8, wherein the sipe is disposed in two or more ribs of the ribs defined by the main grooves.

10. The pneumatic tire according to claim 9, wherein all chamfered portions are configured by the chamfered portions of the sipe.

11. The pneumatic tire according to claim 10, wherein for all chamfered portions, the total projected area $A_{CE}$ of the chamfered portions provided in the center region and each of the total projected areas $A_{SH}$ of the chamfered portions provided in the shoulder regions satisfy a relationship $1\% < (A_{CE} - A_{SH})/A_{CE} \times 100\% \leq 10\%$.

\* \* \* \* \*